Oct. 18, 1932.  J. R. RICHARDSON  1,882,912
APPARATUS FOR THE TREATMENT OF SOIL PRODUCTS
Filed Nov. 6, 1928   2 Sheets-Sheet 2
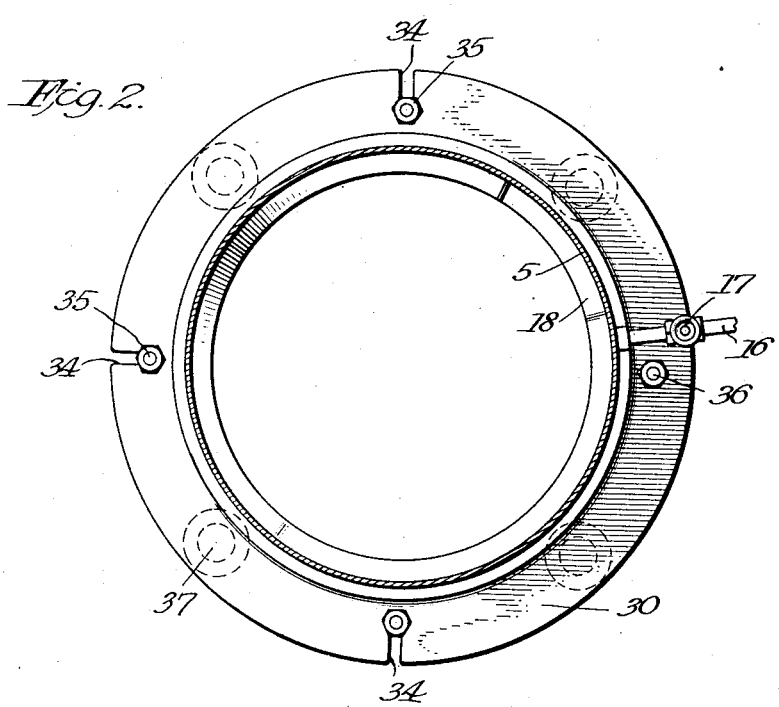
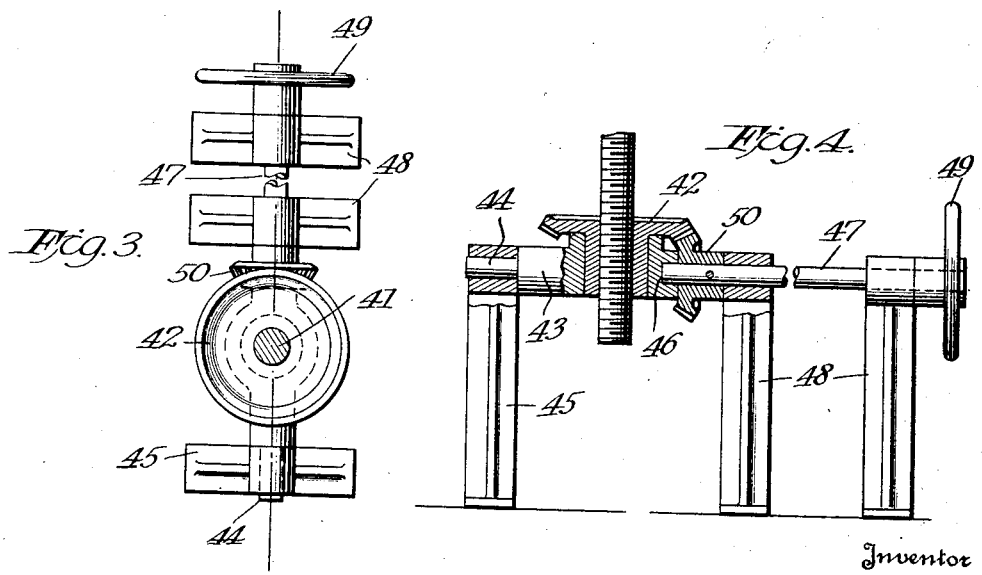
Inventor
James R. Richardson Patented Oct. 18, 1932

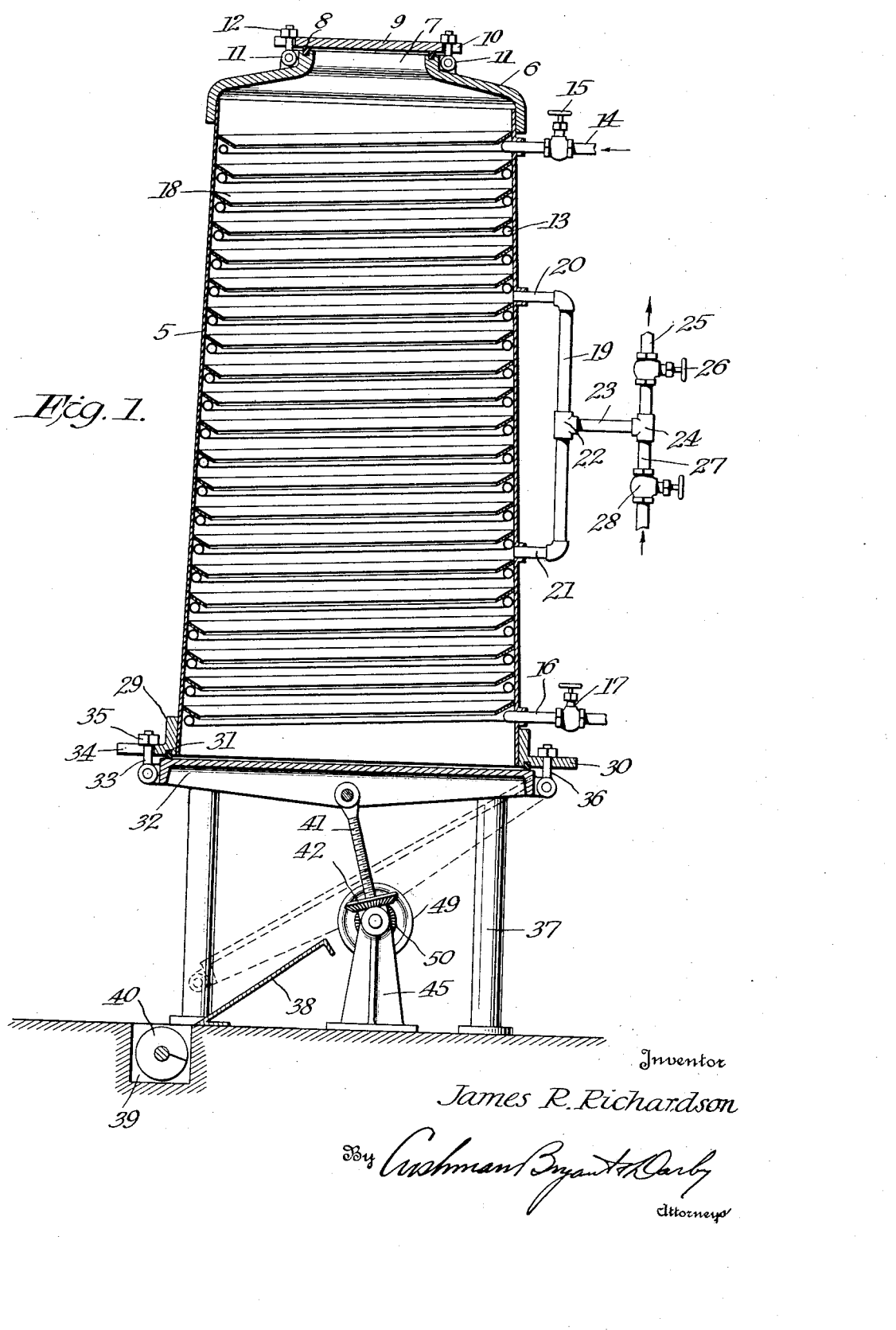

1,882,912

UNITED STATES PATENT OFFICE

JAMES R. RICHARDSON, OF HOUSTON, TEXAS, ASSIGNOR TO ABILINE COTTON OIL COMPANY, OF HOUSTON, TEXAS, A CORPORATION OF TEXAS

APPARATUS FOR THE TREATMENT OF SOIL PRODUCTS

Application filed November 6, 1928. Serial No. 317,675.

This invention relates to new and useful improvements in apparatus for treating soil products, and more particularly to an apparatus which will impart the desired moisture content to cottonseed or other grain or material.

An important object of the invention is to improve upon the apparatus disclosed in my copending application Serial No. 163,238, filed January 24, 1927, in order to effect a more rapid treatment of the material and a more rapid discharge of the material from the apparatus.

Another important object of the invention is to provide a simple and inexpensive means for preventing the material from lodging upon the heat emitting means during discharge of the material whereby all of the material will be totally removed from the treating chamber during the discharge action so that none will be left upon the heat emitting means to impair its efficiency during the treatment of subsequent batches of material.

A still further object of the invention is to provide an arrangement which will effect a thorough and rapid discharge of the material from either side of the apparatus; the arrangement being such as to entirely eliminate the handling of the material and to cause it to be automatically delivered to any desired point.

A still further object of the invention is to provide a combined steam and vacuum conduit communicating at more than one point with the treating chamber.

Another important object of the invention is to provide means for operating the outlet closure under a restraining action in order that this closure may be restrained in any one of a plurality of positions and automatically locked in such position.

Other objects and advantages of the invention will become apparent during the course of the following description.

In the accompanying drawings forming a part of the application, and wherein like numerals are employed to designate like parts throughout the sevral views, Figure 1 is a vertical longitudinal section through the improved apparatus.

Figure 2 is a horizontal transverse section through the same.

Figure 3 is an enlarged top plane of the closure operating means, and

Figure 4 is a fragmentary longitudinal section of the same.

The apparatus disclosed herein is an improvement of the apparatus for carrying out the process described in my copending application Serial No. 163,238, filed January 24, 1927. That process has for its principal object the provision of means whereby the desired moisture content can be imparted to soil products such as cotton-seed and the present apparatus has a corresponding object.

The apparatus herein disclosed consists of a frusto-conical drum or chamber 5, arranged on a vertical axis, as shown. The upper and lower ends of this drum are entirely open for a purpose which will be presently described. The upper end of the chamber 5 is provided with a head 6 secured thereto in an airtight manner and equipped with a restricted inlet opening 7 arranged centrally of the drum 5 and provided with a sealing gasket 8, upon which seats an inlet closure 9 having its periphery provided with a plurality of equidistantly spaced notches 10 for the reception of the shanks of eye bolts 11 pivotally secured to the head 6, as shown. One of such eye bolts, instead of extending through a notch 10, extends through an aperture in the edge of the closure plate and a nut is threaded upon such eye bolt in order to hingedly connect the closure plate to the drying chamber. The other eye bolts 11 are likewise provided with nuts 12, which are adapted to be driven home upon their respective eye bolts to engage the upper surface of the closure plate when it is desired to retain the same in an airtight manner upon the inlet opening 7, and when it is desired to open this closure plate, the nuts 12 of all eye bolts except the one which hingedly connects this closure plate to the head 6, are loosened sufficiently to permit the eye bolts to be swung outwardly and disengaged from the notches in the closure plate so that it may be swung to an open position.

Within the chamber 5 is a heating medium, which, in the present instance, takes the form of a helical coil of imperforate pipe 13 arranged with its convolutions against the inner surfaces of the walls of the drying chamber. The upper end 14 of this coil is extended laterally through the side of the drum 5, and is provided with a valve 15 to constitute an inlet for steam or any other suitable heating medium and the other end of the coil 16 is extended through the same side of the drum adjacent the bottom thereof to provide an outlet for the heating medium, or condensation in case steam is employed. This pipe 16 is also equipped with a valve 17, whereby the flow therethrough may be controlled at will.

In order to prevent the material treated from lodging upon the heating coil 13, a shield 18 is provided and consists of a spirally wound strip of imperforate material, assuming generally the same shape as the frusto-conical shell 5 and having its convolutions spaced apart so that they may be disposed between the convolutions of the heating coil 13 and secured to the inner walls of the shell 5 in a manner to be inclined downwardly and toward the center of the treating chamber as shown.

In order to create a vacuum within the treating chamber, and to supply moisture to the contents thereof, a substantially U-shaped pipe 19 communicates with the interior of the chamber at two different points, by means of the branches 20 and 21. A T coupling 22 is provided in the pipe 19 to provide a connection for a pipe 23, which also serves, through a second T coupling 24, to connect the pipe 23 with a vacuum pipe 25 having a valve 26 therein, and to a steam supply pipe 27 having a control valve 28. The vacuum pipe leads to a vacuum pump or any other suitable means for creating a vacuum within a treating chamber, and when the valve 26 is opened, the valve in the steam pipe 27 is closed so that air within the treating chamber and the material being treated may be removed at two different points through the branches 20 and 21. Likewise, when steam is to be admitted into the treating chamber through the pipe 27, the valve 28 is opened, while the vacuum valve 26 is closed so that steam may then enter the pipe 23 and be directed through the branches 20 and 21 into the treating chamber at two different points.

The bottom of the frusto-conical drum or retort 5 has secured thereto, in an airtight manner, a circular ring 29 constructed of angle iron in order to provide the bottom of the retort with an outwardly extending horizontal annular flange 30. This ring 29, like the head 6, is provided with an air seal gasket 31, upon which is adapted to seat a closure plate 32 for completely closing the entire open bottom of the retort. Eye bolts 33 are secured to the periphery of the closure plate at equally spaced points therearound, and are adapted to extend through notches 34 provided in the horizontal flange 30. Nuts 35 are carried by the eye bolts for the purpose of tightly clamping the closure plate over the open bottom of the retort. One of these eye bolts 36 instead of extending through a notch 34 in the flange 30, projects through an opening in order to hingedly connect the closure 32 with the bottom of the retort; a nut being mounted upon this bolt for abutment with the horizontal flange 30 for maintaining the connection. From this construction it will be seen that the nuts of the eye bolts 33 may be loosened to permit the eye bolts to move out of the notches 34 in order that the closure plate 32 may pivot upon the eye bolt 36 and move to an open position, as shown by the dotted lines in Figure 1. With this arrangement the discharge from the retort will be toward the left hand side of Figure 1, it being appreciated that the closure operates as a means for deflecting the material to the side of the apparatus. When it is desired to discharge the material from the opposite side of the apparatus, the nut of the eye bolt 36 may be totally removed therefrom to permit the eye bolt to become disengaged from the flange 30 when all of the other eye bolts 33 except the eye bolt 33 opposite eye bolt 36 have been adjusted and removed from their respective notches to permit the closure to pivot upon the eye bolt 33 at the left hand side of the apparatus. The closure plate 32 will then be in a position to swing so as to be disposed in a position inclining downwardly toward the right hand side of Figure 1 to discharge material from the retort at this side of the apparatus.

The treating chamber of retort is suitably mounted upon uprights 37 so that its bottom will be disposed in spaced relation to the floor, and in order that the closure plate 32 may swing downwardly to discharge material onto an inclined chute 38 secured to the floor and discharging into a trough 39 having disposed therein a spiral conveyor 40 or any other suitable means for transporting the material to a desired point.

From the foregoing description it will be obvious that practically the entire weight of the material within the treating chamber 5 is disposed upon the closure plate 32, and in order to prevent the weight of the material from rapidly forcing the closure plate to an open position to discharge all of the material at one time, I provide means for gradually opening the closure plate under a restraining action. This means consists of a screw shaft 41 pivotally connected at its upper end to the closure plate 32 so as to depend therefrom. A bevel gear 42 is screwed upon the lower end of the shaft 41 and is rotatably mounted on a vertical axis in an oscillating yoke 43. This yoke 43 is provided at one end with a trunnion 44 adapted to be journalled in an upright 45 projecting from the floor, while the opposite end of the yoke is provided with a socket 46 arranged in alignment with the trunnion 44 for the reception of one end of a rotatable shaft 47 journalled in a pair of upstanding bearings 48 also secured to the floor. The outer end of this shaft 47 is provided with a hand wheel 49 or any other suitable means for effecting rotation of the shaft. Upon the opposite end of this shaft is secured a bevel pinion 50, which is adapted to engage the gear 42 for rotating the same and causing vertical movement of the screw shaft 41. Vertical movement of this screw shaft will obviously cause opening or closing movement of the closure plate 32.

In operation, the closure 32 is closed air-tight against the open bottom of the chamber 5. The inlet closure 9 is opened to permit the entry of sufficient material to practically fill the same, after which this plate is closed air-tight upon the gasket 8. With the valve 28 in the steam pipe closed, the valve 26 in the vacuum line is opened to permit a vacuum to be created within the chamber 5. The vacuum within this chamber causes an internal pressure within the cottonseed or material being treated so as to force all of the trapped air out of the same and to produce voids therein. The valves 15 and 17 may be opened to permit the circulation of steam through the heating coil 13 either before the vacuum is created, or during the existence thereof, depending upon the character of the material and what moisture content it is desired to impart thereto. In case there is a deficiency of moisture content in the material, the valve 28 in the steam line may be opened to permit the entry of steam into the treating chamber through the branches 20 and 21, and this moisture is readily absorbed in the voids of the material being treated.

When the material has been given the desired moisture content, the bottom closure 32 may be opened by manipulation of the hand wheel 49 after the eye bolts have been released and the closure caused to move downwardly so as to rapidly discharge the material into the conveying mechanism 40, where it is conveyed to the desired point. Due to the fact that the treating chamber is frusto-conical in shape and the entire bottom thereof is entirely open, it will be appreciated that practically the entire weight of the material will be imposed upon the closure 32 so that when this is opened the material will be rapidly discharged from the treating chamber.

It will be understood that various changes in the arrangement and construction of the device may be resorted to without departing from the spirit of the invention or the scope of the appended claims.

I claim:

1. A device of the class described, comprising a treating chamber having an inlet and outlet, a heating coil arranged around the inner walls of said chamber, and means extended from the inner walls of said chamber and overlapping said heating coil.

2. A device of the class described, comprising a treating chamber having an inlet and outlet, a heating coil arranged around the inner walls of said chamber, and a spiral shield having its convolutions arranged between the convolutions of said heating coil to overlap the same.

3. A device of the class described, comprising a treating chamber having an inlet and outlet, a heating coil arranged around the inner walls of said chamber, and a spiral inclined shield secured to the inner walls of said chamber and having its convolutions arranged between the convolutions of said heating coil and inclined downwardly over the same toward the center of said chamber.

4. A device of the class described, comprising a frusto-conical chamber arranged on a vertical axis and having an open top and an open bottom, a closure for said open bottom, heating means within said chamber, and the open bottom of the frusto-conical chamber constituting an outlet which facilitates gravitational discharge of material from the chamber.

In testimony whereof I have hereunto set my hand.

JAMES R. RICHARDSON.